United States Patent [19]

Jones

[11] Patent Number: 5,738,934

[45] Date of Patent: Apr. 14, 1998

[54] FLEXIBLE ELECTRODE-BEARING ARTICLE

[75] Inventor: Philip J. Jones, Menlo Park, Calif.

[73] Assignee: Raychem Corporation, Menlo Park, Calif.

[21] Appl. No.: 739,235

[22] Filed: Oct. 29, 1996

Related U.S. Application Data

[63] Continuation of Ser. No. 466,167, Jun. 6, 1995, abandoned.

[51] Int. Cl.$^6$ .............................. H01M 2/16; B32B 27/00
[52] U.S. Cl. ........................ 428/220; 428/336; 428/412; 428/473.5; 428/480; 428/702; 429/42; 429/44; 429/137; 429/193
[58] Field of Search .................................. 428/220, 336, 428/412, 480, 473.5, 702; 310/364; 429/42, 44, 137, 193, 209, 212

[56] References Cited

U.S. PATENT DOCUMENTS

| | | | |
|---|---|---|---|
| 4,559,112 | 12/1985 | Tamamura et al. | 204/12 |
| 4,786,837 | 11/1988 | Kalnin et al. | 310/364 |
| 4,802,745 | 2/1989 | Okada et al. | 350/397 |
| 4,868,284 | 9/1989 | Murase et al. | 528/481 |
| 4,887,890 | 12/1989 | Scherber et al. | 350/357 |
| 5,002,845 | 3/1991 | Shimura et al. | 430/59 |
| 5,042,923 | 8/1991 | Wolf et al. | 359/275 |
| 5,193,668 | 3/1993 | Fukuchi et al. | 200/512 |
| 5,232,631 | 8/1993 | Cao et al. | 252/500 |
| 5,246,627 | 9/1993 | Heeger et al. | 252/500 |
| 5,253,100 | 10/1993 | Yang et al. | 359/266 |
| 5,293,546 | 3/1994 | Tadros et al. | 359/269 |
| 5,310,781 | 5/1994 | Wudl et al. | 524/599 |
| 5,367,041 | 11/1994 | Wudl et al. | 528/167 |

FOREIGN PATENT DOCUMENTS

| | | | |
|---|---|---|---|
| 0400953 | 12/1990 | European Pat. Off. | H01H 13/70 |
| 2278204 | 11/1994 | United Kingdom | G02F 1/1343 |
| WO 91/11325 | 8/1991 | WIPO | B32B 27/32 |

OTHER PUBLICATIONS

Cao et al., Applied Physics Letters, vol. 60, No. 22, pp. 2711–2713 (1 Jun. 1992).
Niwa et al., Macromolecules, vol. 20, No. 4, pp. 749–753 (Apr. 1987).
Patent Abstracts of Japan, vol. 017, No. 412 (P–1583) (Jul. 1993) (abstract of JP 05/080068, Mar. 1993).
Patent Abstracts of Japan, vol. 94, No. 011 (abstract of JP 06/316070 (Nov. 1994).
Andreatta et al., Synthetic Metals, vol. 55, pp. 1017–1022 (1993).
Laakso et al., Synthetic Metals, vol. 37, pp. 145–150 (1990).
Andreatta et al., "Processing Of Conductive Polyaniline–U–HMW Polyethylene Blends From Solutions In Non–Polar Solvents," Synth. Met. 55, pp. 1017–1022 (1993).
MacDiarmid et al., "Science And Technology Of Conducting Polymers," Front. Polym. Res. [Proc. Int. Conf.], 1st, pp. 259–270 (1991) (Plenum, New York).
Andreatta et al., "Processing Of High Performance Conducting Polymers," Science Appl. Conduct. Polym., Pap. Eur. Phys. Soc. Ind. Workshop, 6th, pp. 105–115 (1990).
Andreatta et al., "Conducting Polymer Fibers With Excellent Mechanical Properties And High Electrical Conductivity," Prog. Pac. Symp. Sci., Proc. Pac. Polym. Conf., 1st, pp. 179–192 (1989).
Laakso, "Synthesis And Characterization Of Conducting Polymer Blends Of Poly(3–Alkylthiophenes)," Synth. Met., 37 (1–3), pp. 145–150 (1990).
"Conductive Polymers Spark New Ideas," Machine Design, pp. 161–165 (Oct. 22, 1992).

*Primary Examiner*—H. Thi Le
*Attorney, Agent, or Firm*—Herbert G. Burkard; Yuan Chao

[57] ABSTRACT

An improved electrode for use in displays, including those of the touchscreen type, has a conductive polymeric material disposed over the electrode material at those regions where the electrode is subject to flexing in use, thereby putting the electrode material at risk of cracking. The conductive polymeric material bridges any cracks which may develop, thus providing electrical continuity.

17 Claims, 1 Drawing Sheet

FLEXIBLE ELECTRODE-BEARING ARTICLE

CROSS-REFERENCE TO RELATED APPLICATIONS

This application is a continuation of application Ser. No. 08/466,167, filed Jun. 6, 1995, now abandoned, the disclosure of which is incorporated herein by reference.

TECHNICAL FIELD OF THE INVENTION

This invention relates to a flexible electrode-bearing article for use in displays.

BACKGROUND OF THE INVENTION

Many electronic devices have a display where information is visually output to a user. In devices having a "touchscreen" display, the display also serves as an information input function, the user inputting information by touching an appropriate area of the screen, for example one of the displayed words "YES" or "NO" to answer a question posed by the device.

A combination frequently found in displays is a thin electrode material (e.g., indium tin oxide) supported by a polymer sheet (e.g., polyester). Either or both of the electrode material and the polymeric material may be transparent. Such a combination and its preparation is generally described in Stoddard, U.S. Pat. No. 4,838,656 (1989). In a non-touchscreen type display, such combination may form the front and/or rear electrodes for a liquid crystal display, of the direct view or projection type. Illustrative disclosures include Reamey et al., U.S. Pat. No. 5,405,551 (1995); Jones, U.S. Pat. No. 5,398,081 (1995); Lau, U.S. Pat. No. 5,395,550 (1995); Reamey, U.S. Pat. No. 5,335,101 (1994); Raychem, published PCT application WO 93/18431 (1993); Pearlman, U.S. Pat. No. 4,992,201 (1991); and Parker, U.S. Pat. No. 4,669,828 (1987). In a touchscreen display, such a combination may form the touch-operative part of the display. Illustrative touchscreen disclosures include Kent, U.S. Pat. No. 5,220,136 (1993); Talmadge, Jr., et al., U.S. Pat. No. 4,822,957 (1989); Talmadge, Jr., et al., U.S. Pat. No. 4,777,328 (1988); Gibson et al., U.S. Pat. No. 4,220,815 (1980); and Zenk et al., U.S. Pat. No. 4,085,302 (1978). Further, such a combination may find use in membrane-type switches, either alone or in combination with a liquid crystal display. See, for example, Fergason et al., U.S. Pat. No. 4,789,858 (1988). The disclosures of the aforementioned disclosures are incorporated herein by reference.

In either instance, the electrode/substrate combination may be subject to flexing in use. In a liquid crystal display, the combination may be bent in order to fit into narrow spaces at the periphery of the display, for attachment to leads connecting the electrodes to drive circuitry. In a touchscreen display, the combination is depressed by the inputting touch, to create an electrical contact with an underlying conductor. The electrode material is relatively fragile and may crack or break upon a particular severe flexure or upon repeated flexures, each of which individually is not particularly severe but which cumulatively cause the electrode material to fail. When the electrode material fails, electrical continuity is lost, leading to malfunction of the display.

SUMMARY OF THE INVENTION

The present invention provides an improved electrode structure, in which the electrode material is protected against such failure. Accordingly there is provided an electrode-bearing article, comprising:

a supporting material;

an electrode material disposed over said supporting material, including over a region of said supporting material which is subject to flexing in use, rendering said electrode material susceptible to cracking at such region; and a conductive polymeric material disposed in contact with said electrode material in said region of said supporting material subject to flexing in use, said conductive polymeric material (a) comprising a blend of an intrinsically conducting polymer and a non-conductive polymer and (b) having a Young's modulus of less than 100 $kg/cm^2$.

BRIEF DESCRIPTION OF THE DRAWING(S)

DESCRIPTION OF THE PREFERRED EMBODIMENTS

Figure 1A:
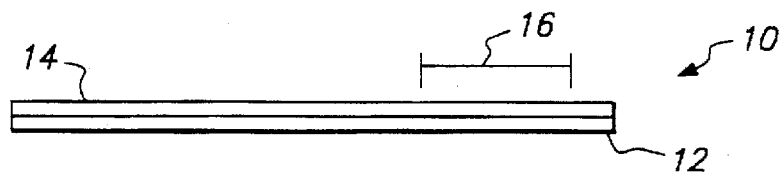
FIG. 1a through 1c depict a prior art electrode material/supporting material combination and the problems associated therewith.
Figure 1B:
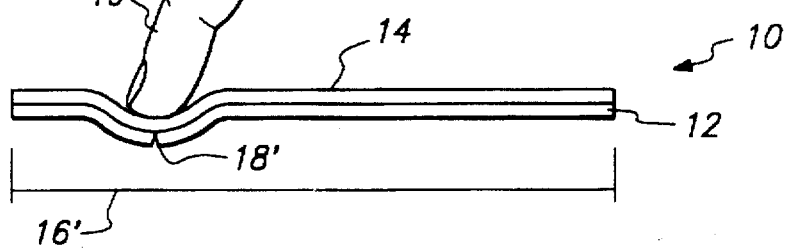
Figure 1C:
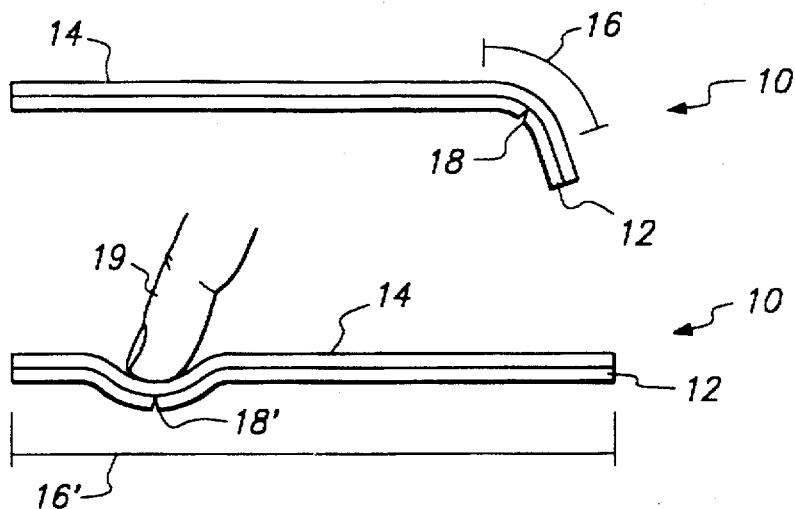

FIG. 1a depicts a prior art electrode-bearing article 10, in which a thin layer of electrode material 12 is supported by supporting material 14. (The thickness of electrode material and supporting material 14 have been greatly exaggerated for clarity.) Region 16 of article 10 is subject to flexing in use. FIG. 1b shows the same article, with region 16 flexed or bent, such as when making connection with leads to drive circuitry. Consequently, electrode material 12 can develop a crack or rupture 18, leading to an electrical discontinuity. FIG. 1c shows the same article, when used in a touchscreen display. Pressure is applied by an input means 19 (such as a finger, as shown, or a stylus, not shown), depressing the touched area to form an electrical contact with an underlying conductor (not shown). As a result of such depression, supporting material 14 and electrode material 12 are both flexed. Because of an accumulation of flexes or a particular hard press by input means 19, a crack 18' may form, again leading to electrical discontinuity. In the instance of FIG. 1c compared to FIG. 1b, the region of article 10 subject to flexing in use is the entire touch-operative surface, as denoted by numeral 16'.

Figure 2A:
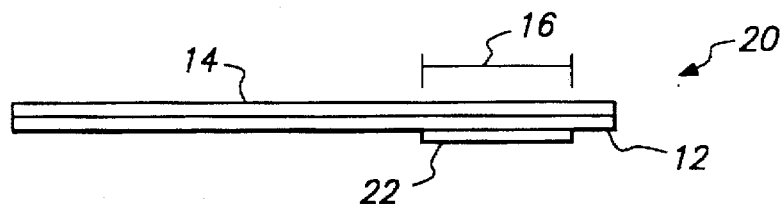
FIG. 2a through 2d depict an electrode material/supporting material combination in accordance with this invention.

This problem is solved by the present invention, as illustrated in FIG. 2a through 2d, where numerals repeated from prior figures denote the same elements. FIG. 2a shows electrode-bearing article 20 having electrode material 12 supported by supporting material 14. Disposed over electrode material 12 in flexing region 16 is a thin layer of conductive polymeric material 22. When article 20 is flexed at region 16 (FIG. 2b), electrode material 12 may develop a crack 18. But because conductive polymeric material 22 bridges the crack, electrical continuity is not lost and no malfunction of the associated device occurs. Instead of disposing conductive polymeric material 22 over electrode material 12 only at region 16, it may be more practical to dispose it over the entire surface of electrode material 12, thereby avoiding the expense or difficulties associated with patterning. Further, such an approach provides flex protection at other regions of article 20, which are not anticipated to be flexed in use but which may be inadvertently flexed.

Figure 2B:
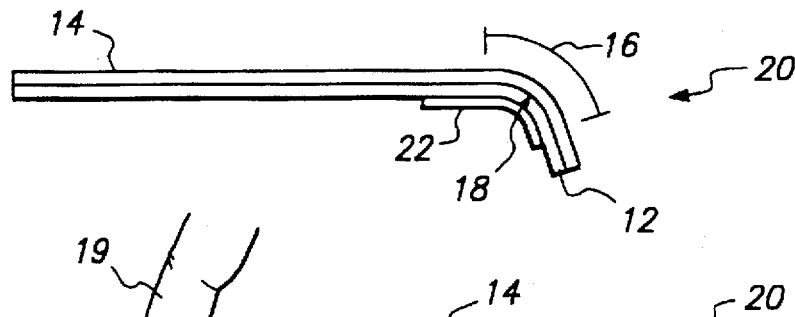
Figure 2C:
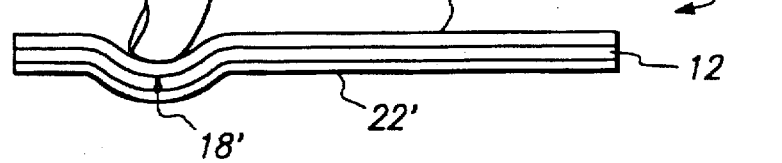

FIG. 2c illustrates the invention in the context of a touchscreen display. Again, the deflection imparted by input means 19 causes electrode material 12 to flex and crack, but the presence of conductive polymeric material 22' bridging crack 18' prevents loss of electrical continuity.

Figure 2D:
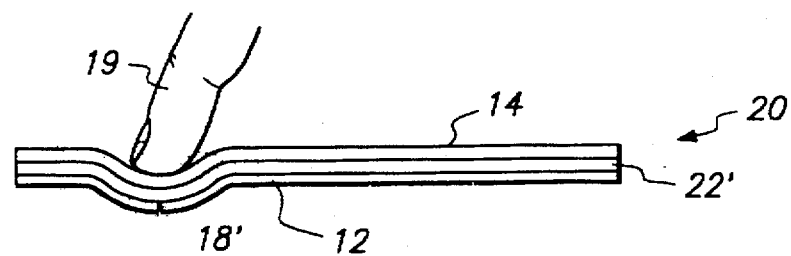

FIG. 2d depicts an alternative embodiment of the invention, in which the positions of electrode material 12 and conductive polymeric material 22' are reversed, that is, conductive polymeric material 22' is interposed between supporting material 14 and electrode material 12. Those skilled in the art will appreciate that this alternative embodiment is also applicable to the invention as shown in FIG. 2a–2b.

The conductive polymeric material is a blend of an intrinsically conducting polymer (hereinafter "ICP") and a non-conductive polymer. The ICP provides the necessary electrical conductivity, while the non-conductive polymer provides the desirable mechanical properties. Such blends are available from Al-Coat, of Ness-Ziona, Israel, in the form of a polyaniline-based spin-coatable solution. Disclosures of other suitable blends include Heeger et al., U.S. Pat. No. 5,246,627 (1993); Cao et al., U.S. Pat. No. 5,232,631 (1993); the Regents of University of California, published international application WO 91/11325 (1991); Andreatta et al., "Processing Of Conductive Polyaniline-UHMW Polyethylene Blends From Solutions In Non-Polar Solvents," Synth. Met. 55, pp. 1017–22 (1993); Laakso et al., "Synthesis And Characterization Of Conducting Polymer Blends Of Poly(3-Alkylthiophenes)," Synth. Met. 37, pp. 145–50 (1990); and "Neste Conducting Polymers" (brochure), by Neste-Uniax New Technology Development (undated); the disclosures of which are incorporated herein by reference.

ICP's are organic polymers which have an extensive, highly conjugated π-electron network in the backbone and which may be doped to impart or enhance the conductive properties. See, for example, MacDiarmid et al., Front. Polym. Res. [Proc. Int. Conf.], 1st, pp. 259–70 (1991) (Plenum, New York). Exemplary suitable ICP's include polypyrrole, polythiophene, polyacetylene, poly(phenylene vinylene), poly(phenylene sulfide), poly(p-phenylene), polyaniline, and poly(heterocycle vinylene). Polyaniline is preferred. A reference herein to an ICP is understood to subsume the substituted variants thereof. For example "polypyrrole" subsumes poly(alkoxy pyrrole) and poly (alkyl pyrrole).

The non-conductive polymer's primary purpose is to provide a matrix for imparting the desired mechanical properties of the conductive polymeric material, as ICP's themselves often are fragile and/or intractable materials. Suitable non-conductive polymers include polyolefins (e.g., polyethylene and polypropylene), polystyrene, poly(vinyl chloride), acrylonitrile-butadiene-styrene copolymer (ABS), aliphatic polyamide (e.g., nylon), aromatic polyamide (e.g., poly(p-phenylene terephthalamide)), acrylic polymers, methacrylate polymers (e.g., poly(methyl methacrylate)), polycarbonate, polysiloxane, polybutadiene, ethylene-vinyl acetate copolymer, elastomers (e.g. EPDM rubber), and fluoropolymers (e.g., polytetrafluoroethylene).

A wide range in the ratio of ICP to non-conductive polymer is permissible, depending on the desired balance of electrical and mechanical properties. Preferably, the weight ratio of ICP to non-conductive polymer is between 1 to 99 and 99 to 1, with a ratio between 9 to 1 and 1 to 9 being more preferred.

The conductive polymeric material should not be too stiff, and therefore its Young's modulus should be less than 100 $kg/cm^2$, preferably less than 10 $kg/cm^2$. Otherwise, it may reduce the flexibility of the electrode-bearing article or be itself subject to breaking during flexing. For similar considerations, the layer of conductive polymeric material should be as thin as possible while retaining the necessary minimum conductivity. Preferably the thickness is less than 1 μm thick, more preferably less than 0.2 μm thick. As a general guide, the flexural stiffness of the article including the conductive polymeric material should be less than twice that of the corresponding article without the conductive polymeric material.

The conductive polymeric material can be applied as a solution over the electrode material by a variety of techniques, such as spin coating, dip coating, spray coating, knife coating, knife-over-roll coating, screen printing, and the like, followed by evaporation of the solvent. The solvent can be an organic solvent such as decalin, tetrahydrofuran, chloroform, and toluene. Those skilled in the art will understand that some adjustment of the viscosity and rheological properties of the solution may be needed to accommodate a particular application technique and that such adjustment can be effected by varying the molecular weight and/or concentration of the non-conductive polymer.

The electrode material can be any one of a number of metal oxides or metals which are depositable onto a substrate as a thin film by deposition techniques such as vacuum evaporation, sputtering, or chemical vapor deposition. Exemplary electrode materials include indium tin oxide ("ITO"), indium oxide, tin oxide, antimony oxide, gold, gold-nickel, and nickel. ITO is preferred.

The supporting material can be any one of a number of polymers available in sheet or film form, such as polyester (especially poly(ethylene terephthalate) ("PET"), available commercially under the tradename Mylar), poly(vinyl chloride), poly(ether sulfone), polycarbonate, polyimide, and poly(ether imide).

As noted above, the conductive polymeric material can be disposed substantially over the entire surface of the electrode material or of the electrode-bearing article, to avoid the process difficulties and expense associated with patterning. In such instances, the conductive polymeric material should have a high enough surface resistance (low enough surface conductance) so as not to interfere with the operation of the electrode, i.e., preferably greater than 100 ohm/square and more preferably greater than 1000 ohm/square.

In a preferred embodiment, the conductive polymeric material, the electrode material, and the supporting material all are substantially transparent, permitting viewing of underlying displayed information or the transmission of light from a backlighting source. Such a particularly preferred combination is polyaniline, ITO, and PET. PET sheets pre-coated with ITO are available commercially from a number of vendors. Such sheets can be etched to provide the desired ITO electrode pattern, and then the polyaniline can be deposited thereon. It is of course understood that where transparency is not a functional requirement (for example, in ITO bus lines), then none of the three elements needs to be transparent.

By way of illustration and not of limitation of my invention, the following experiments were performed. Strips (3×0.5 inches) were cut from a 0.007 inch thick sheet of ITO-coated polyester from Dynapro to provide five control samples (hereinafter referred to as CONTROL 1–5). Squares (3×3 inches) of the same polyester were coated with a polyaniline-based conductive polymeric material on the ITO side by Al-Coat, Israel. The coated squares were cut into 3×0.5 inch strips to provide samples according to the invention (hereinafter referred to as INVENTION 1–3).

In a folding test, strips were folded by hand and creased between forefinger and thumb, with the conductive side on the outside of the crease, and then unfolded. Resistance was measured with a digital voltmeter with contacts made to the strips close to the center of the strip ends. The results are provided in TABLE I. They show that the resistance after folding of the CONTROL samples is greater than that of the INVENTION samples by about one order of magnitude or more.

TABLE I

Hand Creasing Test

| Sample | Resistance (ohms) | |
|---|---|---|
| | Before Folding | After Folding |
| CONTROL 1 | 283 | $35 \times 10^6$ |
| CONTROL 2 | 262 | $34 \times 10^6$ |
| CONTROL 3 | 298 | $52 \times 10^6$ |
| INVENTION 1 | 321 | $1.46 \times 10^6$ |
| INVENTION 2 | 285 | $3.70 \times 10^6$ |

In a second test, samples were rolled around a 5/8 inch steel cylinder mandrel. Resistances were measured after each rolling and are provided in TABLE II. The results show that the sample of this invention withstands 10 rolls without developing any significant increase in resistance, compared to the CONTROL samples, whose resistances increased by at least one order of magnitude within 10 rolls.

TABLE II

Mandrel Rolling Test

| Roll Number | Resistance (ohms) | | |
|---|---|---|---|
| | CONTROL 4 | CONTROL 5 | INVENTION 3 |
| 0 | 267 | 283 | 276 |
| 1 | 260 | 290 | 284 |
| 2 | 267 | 292 | 286 |
| 3 | 345 | 335 | 306 |
| 4 | 535 | 374 | 316 |
| 5 | 880 | 452 | 310 |
| 6 | 2,020 | 808 | 326 |
| 7 | 2,150 | 1,400 | 326 |
| 8 | 2,620 | 2,810 | 331 |
| 9 | 2,950 | 2,980 | 347 |
| 10 | 4,780 | 4,330 | 370 |

After ten rolls, the CONTROL and INVENTION samples were subjected to the crease test as described above. The results are provided in TABLE III. Again, the INVENTION sample was clearly superior, having a final resistance which was lower by about two orders of magnitude.

TABLE III

Hand Creasing Test After Ten Rolls

| Sample | Resistance (ohms) | |
|---|---|---|
| | Before Folding | After Folding |
| CONTROL 4 | 4,780 | $>300 \times 10^6$ |
| CONTROL 5 | 4,330 | $>300 \times 10^6$ |
| INVENTION 3 | 370 | $2.70 \times 10^6$ |

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. An electrode-bearing article, comprising
a supporting material;
an electrode material disposed over said supporting material, including over a region of said supporting material which is subject to flexing in use, rendering said electrode material susceptible to cracking at such region; and
a conductive polymeric material disposed in contact with said electrode material in said region of said supporting material subject to flexing in use, said conductive polymeric material (a) comprising a blend of an intrinsically conducting polymer and a non-conductive polymer and (b) having a Young's modulus of less than 100 $kg/cm^2$.

2. An electrode-bearing article according to claim 1, wherein said intrinsically conducting polymer is selected from the group consisting of polypyrrole, polythiophene, polyacetylene, poly(phenylene vinylene), poly(phenylene sulfide), poly(p-phenylene), polyaniline, and poly(heterocycle vinylene).

3. An electrode-bearing article according to claim 2, wherein said intrinsically conducting polymer is polyaniline.

4. An electrode-bearing article according to claim 1, wherein said non-conductive polymer is selected from the group consisting of polyolefins, polystyrene, poly(vinyl chloride), acrylonitrile-butadiene-styrene copolymer, aliphatic polyamide, aromatic polyamide, acrylic polymers, methacrylate polymers, polycarbonate, polysiloxane, polybutadiene, ethylene-vinyl acetate copolymer, elastomers, and fluoropolymers.

5. An electrode-bearing article according to claim 1, wherein the conductive polymeric material has a Young's modulus of less than 10 $kg/cm^2$.

6. An electrode-bearing article according to claim 1, wherein the conductive polymeric material has a thickness of less than 1 µm.

7. An electrode-bearing article according to claim 1, wherein the electrode-bearing article has a flexural stiffness which is less than twice that of the corresponding article without the conductive polymeric material.

8. An electrode-bearing article according to claim 1, wherein said electrode material is selected from the group consisting of indium tin oxide, indium oxide, tin oxide, antimony oxide, gold, gold-nickel, alloy and nickel.

9. An electrode-bearing article according to claim 8, wherein said electrode material is indium tin oxide.

10. An electrode-bearing article according to claim 1, wherein said supporting material is selected from the group consisting of polyester, poly(vinyl chloride), poly(ether sulfone), polycarbonate, polyimide, and poly(ether imide).

11. An electrode-bearing article according to claim 10, wherein said supporting material is poly(ethylene terephthalate).

12. An electrode-bearing article according to claim 1, wherein said supporting material is poly(ethylene terephthalate), said electrode material is indium tin oxide, and said intrinsically conducting polymer is polyaniline.

13. An electrode-bearing article according to claim 1, wherein said conductive polymeric material is disposed substantially over the entire surface of the electrode material.

14. An electrode-bearing article according to claim 13, wherein said conductive polymeric material has a surface resistance greater than 100 ohm/square.

15. An electrode-bearing article according to claim 1, wherein said conductive polymeric material is disposed on the surface of said electrode material away from said supporting material.

16. An electrode-bearing article according to claim 1, wherein said conductive polymeric material is disposed between said electrode material and said supporting material.

17. An electrode-bearing article according to claim 1, wherein the weight ratio of intrinsically conducting polymer to non-conductive polymer is between 99 to 1 and 1 to 99.

* * * * *